(12) United States Patent  
Chapuis et al.

(10) Patent No.: US 11,740,155 B2  
(45) Date of Patent: Aug. 29, 2023

(54) STRUCTURAL HEALTH MONITORING FOR AN INDUSTRIAL STRUCTURE

(71) Applicant: COMMISSARIAT A L'ENERGIE ATOMIQUE ET AUX ENERGIES ALTERNATIVES, Paris (FR)

(72) Inventors: Bastien Chapuis, Viroflay (FR); Tom Druet, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 252 days.

(21) Appl. No.: 16/761,230

(22) PCT Filed: Oct. 15, 2018

(86) PCT No.: PCT/EP2018/078058  
§ 371 (c)(1),  
(2) Date: May 1, 2020

(87) PCT Pub. No.: WO2019/091705  
PCT Pub. Date: May 16, 2019

(65) Prior Publication Data  
US 2020/0355575 A1 Nov. 12, 2020

(30) Foreign Application Priority Data  
Nov. 8, 2017 (FR) ...................... 1760460

(51) Int. Cl.  
*G01M 5/00* (2006.01)  
*G06F 17/15* (2006.01)  
(Continued)

(52) U.S. Cl.  
CPC ...... *G01M 5/0066* (2013.01); *G01N 29/0672* (2013.01); *G01N 29/14* (2013.01);  
(Continued)

(58) Field of Classification Search  
CPC . G01M 5/0066; G01N 29/0672; G01N 29/14; G01N 29/2412; G01N 29/2437;  
(Continued)

(56) References Cited

U.S. PATENT DOCUMENTS 7,038,190 B2 * 5/2006 Udd .................... G01D 5/35383  
250/227.14  
9,797,869 B2 * 10/2017 Loveday ................. G06F 30/20  
(Continued)

FOREIGN PATENT DOCUMENTS

FR 3 060 743 A1 6/2018  
WO 2015/082292 A1 6/2015

OTHER PUBLICATIONS

Jung et al, "Damage detection on an aluminum plate from the cross-correlation of diffuse field using the support vector machine", May 2018, Ocean Engineering 161 (2018) 88-97 (Year: 2018).*

(Continued)

*Primary Examiner* — Aditya S Bhat  
(74) *Attorney, Agent, or Firm* — BakerHostetler

(57) ABSTRACT

Methods and systems for analyzing an industrial structure are provided. With a plurality of sensors (e.g. FBGs and/or piezoelectric transducers and/or electromagnetic acoustic transducers) deployed in, on or in proximity to the structure, sensors are interrogated and a function representative of the impulse response of the structure is determined by passive (Continued)

inverse filter. Subsequently, a map of the propagation of the elastic waves through the structure is determined via various modalities, and in particular by tomography (of bulk or guided waves, by analysis of time of flight or of the complete signal). Embodiments especially relate to the management of the number and position of the sensors, to the use of artificial noise sources, and to automatically controlling the sensors and/or noise sources to monitor the health of the structure, or even to view the dynamic behavior of the structure.

13 Claims, 5 Drawing Sheets

(51) Int. Cl.
  *G06T 7/00* (2017.01)
  *G01N 29/24* (2006.01)
  *G01N 29/46* (2006.01)
  *G01N 29/14* (2006.01)
  *G01N 29/06* (2006.01)

(52) U.S. Cl.
  CPC ..... *G01N 29/2412* (2013.01); *G01N 29/2437* (2013.01); *G01N 29/2475* (2013.01); *G01N 29/46* (2013.01); *G06F 17/156* (2013.01); *G06T 7/0002* (2013.01); *G01N 2291/0231* (2013.01); *G01N 2291/0289* (2013.01); *G01N 2291/02827* (2013.01); *G01N 2291/2694* (2013.01); *G06T 2207/10072* (2013.01)

(58) Field of Classification Search
  CPC ... G01N 29/2475; G01N 29/46; G06F 17/156
  See application file for complete search history.

(56) References Cited

U.S. PATENT DOCUMENTS

| | | | |
|---|---|---|---|
| 2009/0178483 A1* | 7/2009 | Angelsen | G01S 7/52022 73/597 |
| 2016/0363562 A1* | 12/2016 | Takahashi | G01N 29/46 |
| 2019/0317056 A1* | 10/2019 | Druet | G01N 29/50 |
| 2020/0191754 A1* | 6/2020 | Findikoglu | G01N 29/223 |
| 2020/0355575 A1* | 11/2020 | Chapuis | G01N 29/043 |

OTHER PUBLICATIONS

Schurr et al, "Damage detection in concrete using coda wave interferometry", 2011, NDT&EInternational44(2011)728-735 (Year: 2011).*

Spurr et al, "Discrete-ordinate radiative transfer in a stratified medium with first-order rotational Raman scattering", Journal of Quantitative Spectroscopy & Radiative Transfer 109 (2008) 404-425 (Year: 2008).*

Roel Snieder et al, "Monitoring change in volcanic interiors using coda wave interferometry: Application to Arenal Volcano, Costa Rica" Geophysical Research Letters, vol. 31, L09608, doi:10.1029/2004GL019670, 2004 (Year: 2004).*

Gallot et al, "A passive inverse filter for Green's function retrieval", 2012, The Journal of the Acoustical Society of America 131, EL21 (2012); doi: 10.1121/1.3665397 (Year: 2012).*

Moulin, et al., "Applicability of acoustic noise correlation for structural health monitoring in nondiffuse field conditions", Applied Physics Letters, 95, 094104, 2009.

Gallot, et al., "A passive inverse filter for Green's function retrieval", The Journal of the Acoustical Society of America, vol. 131, No. 1, Jan. 1, 2012.

Tanter, et al., "Time Reversal and the Inverse Filter", The Journal Acoustical Society of America, vol. 108, No. 1, pp. 223-234, Jul. 1, 2000.

* cited by examiner

| | Correlation | Passive inverse filter |
|---|---|---|
| Principle | Measurement of noise simultaneously at two points A and B, then correlation of the noise → G(A,B) | Measurement of noise simultaneously at all the points of interest $X_i$, then computation of the PIF → $G(X_i,X_j)$ |
| Measurement | Pair by pair or simultaneous at all the points | Simultaneous at all the points |
| If assumption of equipartition valid | Suitable | Suitable |
| If assumption of equipartition invalid | Non-convergence | Compensation for non-uniformities |
| Frequency behavior | The spectrum must be whitened | Allows the spectrum to be whitened |
| Number of sensors | No influence on the quality of the convergence | If the number of sensors increases, the quality of the PIF increases, imaging better |
| Computing cost | Rapid (for few points) | Demanding in RAM |

FIG. 5

STRUCTURAL HEALTH MONITORING FOR AN INDUSTRIAL STRUCTURE

CROSS-REFERENCE TO RELATED APPLICATIONS

This application is a National Stage of International patent application PCT/EP2018/078058, filed on Oct. 15, 2018, which claims priority to foreign French patent application No. FR 1760460, filed on Nov. 8, 2017, the disclosures of which are incorporated by reference in their entirety.

FIELD OF THE INVENTION

The invention relates to the field of metrology in general, and in particular to the field of monitoring the health of industrial structures, i.e. structural health monitoring or SHM.

BACKGROUND

The integrity of structures (works of art, airplane wings or a pipeline, for example) over their life is generally monitored during maintenance operations, with human inspection and intervention. One concrete technical problem for example consists in detecting and determining the size of a corroded region in an airplane fuselage.

For these inspections of integrity, non-destructive testing (NDT) methods employing "conventional" techniques (ultrasound, electromagnetic techniques, etc.) are generally used. Research aiming to integrate sensors into a structure at key points of the structure has been underway for a number of years, with a view to automating the measurements (which are for example taken at regular intervals, these intervals generally being closely spaced in time) and to making it possible to access information of the state of health of certain inaccessible regions, without removal of the structure or interruption of its operation. In general, this research aims to increase the time between maintenance operations, and therefore to save money.

In particular, certain research has made provision to use guided ultrasonic waves (GWs) emitted and detected by piezoelectric transducers (PZT transducers, for example) integrated into the structure. These guided waves propagate over a large distance (a few tens of centimeters to a few hundred meters), and hence a limited number of transducers allows a large area to be monitored. In practice, an array of transducers is arranged on the structure and the signals propagating between two transducers are recorded (pitch-catch operation). Optionally, the same transducer may be used as emitter and as receiver (pulse-echo operation). Other technologies may be used to emit and/or detect the guided ultrasonic waves (apart from optical fibers, films of polyvinylidene fluoride (PVDF), electromagnetic acoustic transducers (EMATs) or even magnetostrictive sensors for example).

A general technical problem is that of finding an acceptable compromise between the nature of the sensors to be integrated, the number of these sensors (cost, bulk, weight, etc.) and the quality of the information collectable by these sensors.

The known approaches have limitations.

Patent application WO2015/082292 describes a passive tomography solution, using a correlation-based analyzing method. The invention exploits ambient elastic noise (naturally present in the structure). The noise naturally present in the structure to be studied is measured synchronously by all of the guided-elastic-wave sensors (in this case FBGs, FBG being the acronym of fiber Bragg grating) arranged on the structure. The inter-sensor response is identified using a correlation algorithm. Lastly, a map is computed, especially by (time-of-flight) tomography, allowing potential defects to be detected, located and characterized. The document describes the use of Bragg-grating sensors and improvements based on piezoelectric (PZT) sensors. The intrusiveness is minimal in the FBG case (because the optical fibers have particularly small dimensions). With PZT sensors, it remains limited because the passive operating mode (i.e. no elastic waves are emitted by the system) employed simplifies the on-board electronics, which need solely operate in reception and hence do not require circuits for emitting elastic waves.

Nevertheless, despite its advantages, the solution described in WO 2015/082292 has limitations. Firstly, this solution is based on "diffuse-field correlation", which assumes the ambient noise is equally distributed throughout the structure. In many industrial applications, this condition is not checked. For example, regarding an airplane-wing profile, the noise on the pressure side differs from the noise on the suction side. In the same way, a fluid flowing through a pipe naturally induces noise in a privileged direction. Moreover, the tomography algorithm used in document WO2015/082292 is a time-of-flight tomography algorithm. This type of tomography can only characterize a limited class of defects (i.e. weakly diffracting structural defects). The defect morphologies that can be characterized are limited.

Still in the technical field of structural health monitoring, the article entitled "*Applicability of acoustic noise correlation for structural health monitoring in nondiffuse field conditions*" by Moulin et al. published in 2009 in *Applied Physics Letters* (95, 094104, 2009) mentions the fact that in practice the noise source does not necessarily respect the equipartition assumption, in a health-monitoring application. Despite its advantageousness, the approach adopted in this document has limitations. The author does not mention alternative techniques to the correlation-based analyzing method for extracting information on a structural defect. He also does not suggest improving the convergence to the Green's function.

There is a need for methods and systems that at least partially mitigate the aforementioned drawbacks.

SUMMARY OF THE INVENTION

This document describes methods and systems for analyzing an industrial structure. With a plurality of FBG sensors and/or PZT piezoelectric transducers and/or EMATs deployed on the structure, FBG and/or PZT and/or EMAT sensors are interrogated and a function representative of the impulse response of the structure is determined by passive inverse filter. Subsequently, a map of the propagation of the elastic waves through the structure is determined via various modalities, and in particular by tomography (of bulk or guided waves, by analysis of time of flight or of the complete signal). Embodiments especially relate to the management of the number and position of the sensors, to the use of artificial noise sources, and to automatically controlling the sensors and/or noise sources to monitor the health of the structure, or even to view the dynamic behavior of the structure.

Advantageously, the embodiments of the invention allow maps of thin and extensive structures (plates, tubes, reservoirs, rails or tanks) to be provided with a view to using an array of guided-elastic-wave sensors to detect defects completely passively (i.e. without emitting waves). Exploitable noise sources are, for example, aerodynamic turbulence around the fuselage of an airplane, a fluid flowing through a pipe, or even vibrations/friction against the structure.

Advantageously, the embodiments of the invention based on passive inverse filter PIF allow signals of very good quality to be obtained, i.e. signals that are sufficient to allow tomography imaging algorithms better than time-of-flight tomography algorithms to be employed.

Advantageously, the use of a PIF ("passive inverse filter") algorithm to identify the inter-sensor response allows the uniformity of the spatial distribution of the noise sources to be increased and, therefore, the non-equipartition of the noise to be compensated for. This allows passive tomography to be applied to a much larger class of industrial configurations. It is also much less intensive in terms of computing time and allows tomographs (images) of the structure to be delivered at high rates.

Advantageously, the embodiments of the invention may exploit tomography algorithms that are not based solely on time of flight, but on the complete ultrasonic signal. These tomography algorithms allow significantly more types of structural defects to be characterized.

BRIEF DESCRIPTION OF THE DRAWINGS

Various aspects and advantages of the invention will become apparent on reading the description of a preferred but non-limiting implementation of the invention, with reference to the following figures:

FIG. 5 compares the methods for analyzing by correlation and by passive inverse filter.

DETAILED DESCRIPTION

Figure 1:
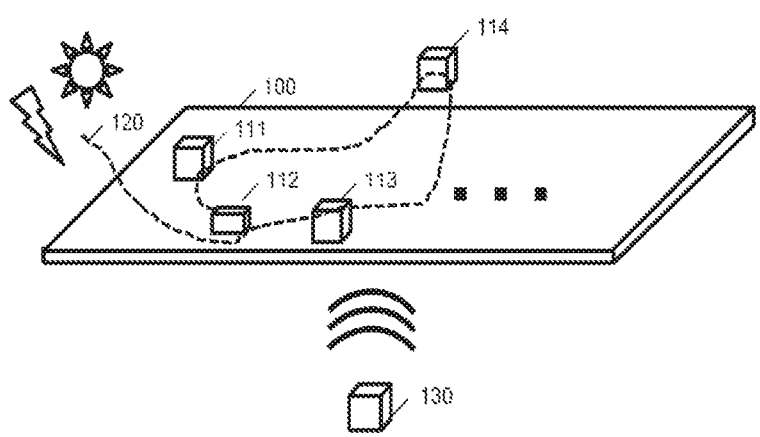
FIG. 1 shows the schematic of an example of a device according to the invention.

A "diffuse elastic field" designates waves that propagate through a continuous medium, a solid medium for example. Liquid and gaseous media are generally excluded from the scope of the invention. The term "diffuse" indeed underlines that propagation effects occur in the medium (e.g. refraction, diffraction, reverberation, etc.). The types of media in question are therefore those addressed in the technical field of structural health monitoring in industrial environments (e.g. airplane-wing profiles, beams, tubes or pipes, sheets of steel or slabs of concrete, etc.).

The diffuse elastic field is due to "ambient noise". This noise may be of natural origin (turbulence around an airplane-wing profile). In certain embodiments, in addition to ambient noise, one or more sources of "active" or "artificial" noise may advantageously be used.

The Green's function (of a medium or of a structure or of a space) designates the solution of a linear differential equation (or partial differential equation) the coefficients of which are constants. It describes the propagation of waves in this space (a "propagator" to use Feynman's terminology). The Green's function (or impulse response) of a given structure can only be estimated, i.e. via one or more functions representative of the Green's function.

The present invention works in a frequency band, of finite limits, that covers the useful information to be extracted from the structure.

The measurements are carried out substantially simultaneously, i.e. the physical sensors deliver CAD signals, i.e. continuously acquired analog (voltage) values, that are digitized in parallel. The instants in time marking the start of the processing of the signals in each of the acquisition channels (i.e. for each sensor) are as closely spaced in time as possible.

In contrast to techniques using methods based on inter-sensor noise correlation, the present invention does not require the presence of an equipartition of energy. The expression "equipartition of energy" means that the total energy of a system in thermodynamic equilibrium is distributed equally on average between its various components (irrespectively of their nature, i.e. spatial, temporal, frequential).

The measurements of the diffuse elastic field form time vectors, containing useful physical information and measurement noise associated with the sensors.

A Bragg grating (or distributed Bragg reflector or fiber Bragg grating (FBG)) is a high-quality reflector used in waveguides, for example in optical fibers. It is a structure in which layers of two materials of different refractive indices alternate, this causing a periodic variation in the effective refractive index in the guide. A Bragg grating is a submicronscale modulation of the refractive index of the core of the fiber: a grating of a few millimeters thus contains several thousand steps. From a functional point of view, it plays the role of a reflector for a narrow spectral band centered on a characteristic wavelength proportional to the pitch and to the index of the core of the fiber. Thus, any modification of these parameters moves the Bragg wavelength proportionally. Tracking its spectral movements allows the inducing parameters, such as temperature or deformations undergone locally by the optical fiber, to be evaluated. These Bragg gratings are generally produced by laser within the cores of single-mode fibers. These gratings may especially be inscribed by transverse exposure with an interference pattern created by two laser beams.

One type of passive inverse filter is described in the article entitled "*A passive inverse filter for Green's function retrieval*" (by Gallot, Catheline, Roux, Campillo) and published in 2011 in the *Journal of the Acoustical Society of America*. Analysis by passive inverse filter has on the whole been studied very little.

The use of this type of filter is known in specific technical fields, namely the analysis of medical images and geophysics, which are technical fields that are very different to that of structural health monitoring (SHM).

Specifically, with respect to the medical technical field, the corresponding media are not actually comparable. The objects are different (e.g. soft tissues or tissue of specific rheology in the medical field versus solid media in structural monitoring). The types of structure to be imaged are very different (e.g. local hardening versus structural defects such as cracks or delamination). The range of sensors used therein is smaller: in general, the only sensors used are PZT sensors. The way in which the signal is processed is also very different: solely bulk, and hence not dispersive, waves are considered in the medical field (in contrast to the guided waves generally employed in SHM). The complex signal generated by these waves must be processed (taking dispersion into account).

With respect to the technical field of geophysics, this field of research also addresses solid media but the orders of magnitude of the structures and effects in question and the issues faced are very different. The processing of the signal is very different: the time constants of the propagation effects are different (period of the waves of a few seconds to a few tens of seconds in geophysics, versus a few milliseconds to a few hundred nanoseconds in structural monitoring). The instrumentation deployed is therefore very different. The sensors employed in geophysics comprise geophones or accelerometers. Because of the (kilometer-scale) dimensions of the analyzed objects, the measurements are performed with sources that are very far apart from one another, and that are not connected to one another, i.e. desynchronized. The data are transferred to a processing center, which is responsible for synchronizing them (in general via a GPS frame that dates the time of the measurement). In SHM, in contrast, the sensors are generally connected by wire to the same acquisition unit because, given the time constants involved, measurements that are synchronized well with one another are required, this being guaranteed by the acquisition unit (the negligible length of the cables being neglected). A GPS synchronization would not be precise enough. The propagation non-uniformities that it is sought to image are very different from the defects encountered in structural health monitoring (presence of pockets of gas or oil, presence of magma in the magma chamber of a volcano or fault versus delamination, cracks, holes, debonding, porosity, loss of thickness, weakness, etc.).

FIG. 1 shows the schematic of an example of a device according to the invention.

In the illustrated example, the device for analyzing the structure 100 comprises an optical fiber and/or conductive wires 120 interconnecting sensors (111, 112, 113, 114, etc.). These sensors are placed in or on or in proximity to the structure. Optionally, one or more noise sources 130 may excite the structure.

The expression "in or on or in proximity to the [structure]" means that the noise sources may be integrated into the structure (e.g. melted, molded, poured "into") and/or arranged above (e.g. placed "on" or adhesively bonded or magnetically or otherwise fastened "to") the structure but also associated with the structure (i.e. without necessarily making contact with the structure; for example an aerial transducer may capture acoustic radiation from the structure or indeed a laser may measure micro-deformations of the surface of the structure).

In one embodiment, the system for analyzing the structure 100 comprises a plurality of FBG sensors and/or PZT piezoelectric transducers and/or EMAT sensors (111, 112, 113, 114, etc.); —the FBG sensors being borne by one or more optical fibers 120 coupled to one or more light sources and one or more cables 120 connecting the PZT piezoelectric transducers or EMAT sensors; —at least one photodetector (not shown) and/or at least one optical spectrum analyzer (not shown) for analyzing the light reflected after its journey through the optical fiber; —computational resources (not shown) for processing the signals received from the FBG and/or PZT and/or EMAT sensors, in order to perform analyses by passive inverse filter and imaging.

In one embodiment, the light source is a laser, the wavelength of which is varied, or a wideband optical source, the reflected optical spectrum of which is defined.

According to embodiments, FBG and/or PZT and/or EMAT sensors may be used. The technical effects and advantages of the invention that are associated with the types of sensors used are described below (in particular the sensors/passive inverse filter synergies).

Generally, for all types of FBG, PZT and EMAT sensors, the method for analyzing by passive inverse filter allows arrangements of the sensors in space that are less constrained in their layout with respect to the noise sources: they may be "freely" positioned on the structure to be analyzed. At the very least, it is possible to place the sensors optimally to obtain a good resolution from the imaging algorithms. With correlation-based analyzing methods, the layout of the sensors is necessarily constrained by the noise source, and this may be the origin of artefacts, and therefore of false alarms, in the imaging algorithms. It is therefore advantageous to use analysis by passive inverse filter in this context.

Moreover, methods for analyzing by passive inverse filter allow the use of a wider range of sensors to be considered. It is for example possible to use sensors that are not omnidirectional (i.e. non-omnidirectional sensors), this possibly having advantages in terms of cost and of simplicity of implementation (for example if there are, on the structure to be analyzed, geometric constraints on the placement of the sensors).

The advantages are not merely operational. The advantages in terms of processing of the signal are also significant.

In one embodiment, the method or the system according to the invention comprises FBG sensors, FBG being the acronym of fiber Bragg grating. These FBG sensors are borne by at least one optical fiber. In one embodiment, the system according to the invention comprises only FBG sensors.

Specifically, FBG sensors operate particularly well with the method according to the invention (synergies between FBG and analysis by passive inverse filter).

The use of FBG sensors with a passive inverse filter especially allows a better reconstruction of the function representative of the impulse response, in comparison to methods for analyzing by correlation (for which the residues are smaller). The use of analysis by passive inverse filter according to the invention allows the layout of the fiber to be simplified, with meanders no longer being necessary to achieve optimal alignment of the FBG sensors with respect to one another. Moreover, the costs associated with FBG sensors are decreasing. They are currently due above all to the electronics (interrogator), the marginal cost of an additional FBG sensor remaining low. It is thus possible to provide a high number of sensors. FBG sensors are well suited to extreme environments (from cryogenic temperatures to very high temperatures; resistance to radiation, to chemical attack, to corrosion, etc.). Noteworthily, these sensors are very unintrusive and may in particular be embedded in composite materials.

In one embodiment, a sensor comprises at least one PZT piezoelectric transducer. PZT sensors are very inexpensive sensors whose implementation is thoroughly mastered (especially in terms of ease of installation and processing of the signal). In one embodiment, the system according to the invention comprises only PZT sensors. In one embodiment, the system according to the invention comprises a combination of FBG sensors and PZT sensors. The latter combination especially allows advantageous compromises in terms of cost and of capture of the signal (PZT sensors allow the structure to be analyzed to be covered at lower cost, whereas FBG sensors may be concentrated in delicate or interesting locations).

In one embodiment, the method or the system for analyzing by passive inverse filter according to the invention may comprise EMATs, EMAT being the acronym of electromagnetic acoustic transducers. EMATs are also referred to here as EMAT sensors. In one embodiment, the system according to the invention comprises only EMAT sensors. In one embodiment, the system according to the invention comprises a combination of EMAT sensors and PZT sensors, or indeed a combination of EMAT sensors and FBG sensors, or indeed even a combination of EMAT, PZT and FBG sensors (allowing advantageous cost/signal compromises).

The use of EMAT sensors is particularly advantageous for monitoring pipes or pipelines for transporting a fluid (gas or liquid). These sensors are inexpensive. They are generally insensitive or not very sensitive to aging (in particular of the adhesive that holds them on the structure to be analyzed). Since these sensors are contactless, they may be well-suited to high-temperature working environments. These sensors collect a sufficient amount of noise to allow the function representative of the impulse response to be converged to. These sensors are particularly well-suited to monitoring metal structures.

In one embodiment, the system comprises a plurality of optical fibers 120, the optical fibers being multiplexed by means of at least one optical circulator and/or one multiplexer. Each sensor or couple or pair of sensors may be interrogated separately.

The advantages related to the embodiments and to the use of optical fibers are a small bulk, a low weight, a high bandwidth, a substantial extendibility, electromagnetic immunity, a good resistance to severe or ionizing radiation and to very high temperatures, inter alia.

According to one variant, one or more optical fibers may be arranged with "meanders".

In one embodiment, the system furthermore comprises one or more active noise sources 130 positioned in or on or in proximity to the structure so as to obtain a diffuse elastic field.

The presence of one or more active or artificial noise sources 130 is an advantageous but entirely optional additional feature. Specifically, the embodiments of the invention work in the presence of the noise naturally present in the structure (ambient noise). Nevertheless, the provision of external energy is advantageous in that it guarantees the presence of a noise source possessing the right spectral characteristics at the moment of the measurement. The active noise sources are controllable or controlled, by definition. The condition of equipartition of the noise is not truly met with active noise sources: using in combination therewith a method based on a passive inverse filter allows precisely this type of configuration (which is much more frequent than the situation in which the energy is assumed to be equally distributed and to which correlation-based methods have been applied in the prior art) to be handled.

In one embodiment, at least one active noise source 130 is a power transducer. In one embodiment a "shaker" may be used.

Generally, whether the noise source 130 is active or not (natural ambient noise), a measurement point (PZT and/or Bragg and/or EMAT transducer) is generally used at a low frequency (between 10 and 1000 kHz) dependent on a compromise between frequency and resolution (the resolution of the imaging—and therefore the ability to detect defects that are small and/or early—increases as frequency increases, but the passive noise source is generally more energetic at low frequency). The distance of propagation through the structure generally decreases as frequency increases. For example, this may have an influence on the layout of the sensors (in a circle e.g. of 60 centimeters diameter, etc.).

In one embodiment, at least one noise source 130 is removable. In one embodiment, the noise sources are irremovable. In one embodiment, some noise sources are removable whereas others are irremovable. In one embodiment, certain noise sources are moveable (e.g. manually moveable by a human and/or machine, i.e. by robots and/or drones).

In one embodiment, the structure to be analyzed comprises a pipe or pipeline for transporting a fluid. The structure may be a pipeline for transporting gas or hydrocarbons. The structure may be a pipe for transporting a liquid (for example a water pipe for a nuclear-reactor cooling circuit).

Figure 2:
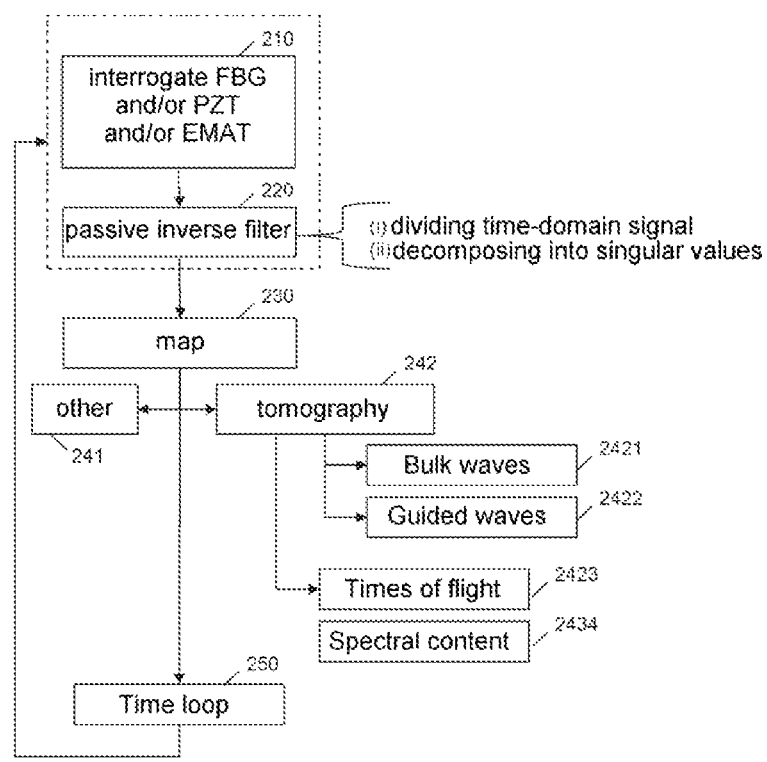
FIG. 2 illustrates examples of steps of the method according to one embodiment of the invention.

FIG. 2 illustrates examples of steps of the method according to one embodiment of the invention.

In one embodiment, a computer-implemented method for analyzing a structure 100 by passive inverse filter 220 is employed, a plurality of FBG sensors and/or PZT piezoelectric transducers and/or EMATs (111, 112, 113, 114, etc.) being deployed in or on the structure 100 to be analyzed, the FBG sensors being borne by at least one optical fiber 120; the method comprising the steps of: —interrogating 210 at least some of the pairs of FBG and/or PZT and/or EMAT sensors; —and determining by passive inverse filter 220 a function representative of the impulse response of the structure for each of the pairs of sensors interrogated.

The passive inverse filter determines the representative functions from the measurement of the noise (diffuse elastic field).

The impulse response of the structure (the Green's function) is unique. The functions representative of this impulse response are multifarious. A function representative of the impulse response corresponds in a certain way to a partial view of this impulse response (schematically to a spectral window and/or a convolution of the Green's function with the response of a sensor).

The meaning of the term "interrogate" 210 depends on the embodiment in question. In the case of an embodiment comprising an optical fiber, the interrogation of one or more sensors may consist in emitting light via one end of the fiber and looking at the reflected spectrum (at the same end) or the transmitted spectrum (at the other end of the fiber). In the case of an embodiment comprising piezoelectric sensors and/or EMATs, the interrogation consists in receiving measurements from the sensors (e.g. voltages across the terminals of the sensors).

The interrogation may be "substantially simultaneous". The term "substantially" is used to refer to the velocity of the elastic waves and to the fact that metrologically speaking the interrogations occur in one time delta (the time intervals are closely spaced, to obtain measurements that are significant from the point of view of propagation of the elastic waves through the structure).

All or some of the sensors may be interrogated, in various ways. A subset of sensors may be interrogated substantially simultaneously, whereas another subset may be the object of a delayed interrogation (for example they may be interrogated sequentially or in parallel in pairs or indeed these modes of interrogation may be combined, rotated, etc.).

In one embodiment, a measurement point comprises one and only one sensor. In one embodiment, a measurement point comprises a plurality of measurement points, for example with a plurality of FBGs. In one advantageous embodiment, the measurement points are arranged in a rosette. This rosette configuration is a compromise that minimizes the number of hardware elements while ensuring a good measurement quality. A measurement point may also comprise any number of FBG sensors (for example five sensors, six sensors, etc.).

In one embodiment, the step of determining, by passive inverse filter, a function representative of the impulse response of the structure to be analyzed comprises the steps of (i) dividing the signals measured by all the sensors into a plurality of sub-vectors or pseudo-sources and (ii) decomposing into singular values monochromatic propagation matrices.

In one embodiment, the singular values that are obtained may be partitioned into two groups, a first group of values representative of the physical information of interest and a second group of values (which may subsequently be set to zero). Various methods allow the threshold value to be set (in particular depending on how the singular values decrease when they are ordered).

In one embodiment, the step of determining by passive inverse filter a function representative of the impulse response of the structure to be analyzed comprises the steps of a) dividing the measured time-domain signal into a plurality of sub-vectors or pseudo-sources; b) decomposing into singular values monochromatic propagation matrices determined from the pseudo-sources in the frequency domain; c) obtaining a function representative of the impulse response in the time domain by inverse Fourier transform.

In one embodiment, the step of determining by passive inverse filter functions representative of the impulse response of the structure, for each of the pairs of sensors interrogated, comprises the steps of:—receiving the signals of measurement of the diffuse elastic field from the N physical FBG and/or PZT and/or EMAT sensors substantially simultaneously, the diffuse elastic field not necessarily meeting a condition of equipartition of energy, said measurements defining a plurality of time vectors; —dividing said time vectors into a plurality of sub-vectors or pseudo-sources; —for each of the pseudo-sources, performing a Fourier transform at frequency w; —for each frequency w: 1) determining the monochromatic propagation matrix H(w) relating the pseudo-sources to the measurement points; 2) determining a plurality of singular values by decomposing into singular values each matrix H(w); 3) ordering and thresholding said singular values into a first group of values representative of the physical information of interest and a second group of values that are set to zero; 4) determining $N^2$ functions representative of the impulse response of the structure (one for each of the pairs of actual physical sensors); —determining $N^2$ time-dependent functions representative of the impulse response of the structure by concatenating the inverse Fourier transforms of the $N^2$ functions representative of the impulse response, which are computed in the frequency domain.

The sub-vectors may be called "pseudo-sources".

In one embodiment, the method furthermore comprises a step of determining one or more images comprising a map 230 of the propagation of the elastic waves through the structure, the images being determined by one or more imaging methods selected from a tomography imaging method 242 or other methods 241 (comprising an ultrasonography imaging method, a total-focusing imaging method, a synthetic aperture imaging method, a spatial-filtering imaging method, a time-reversal imaging method or a high-resolution imaging method).

An obtained plan or map comprises an image of the structure. This image is interpretable: for example, the extent of a damaged zone may be seen. For damage due to corrosion for example, it is possible to determine the extent and the residual thickness. Consequently, the gravity of the damage may be evaluated, in order where appropriate to take corrective measures.

Depending on the imaging algorithms used, the result is not necessarily a map of the propagation velocity of the elastic waves through the structure. For example, the map 230 may comprise a representation of the structure that is color-coded depending on the amplitude of the signal. The representation is not necessarily directly related to a physical characteristic of the structure (in contrast for example to velocity, which is directly related to the thickness of a plate in the case of guided waves).

In one embodiment, the method furthermore comprises a step of determining by tomography 242 one or more images comprising a map of propagation of the elastic waves through the structure.

The map may represent various physical or logical parameters. For example, the map may be a map of amplitude. It may also be a map of velocity (e.g. showing the wave velocity field, i.e. a plurality of propagation velocities).

The propagation velocities, for their part, allow potential structural defects (e.g. delamination, cracks, holes, debonding, porosity, loss of thickness, weakness, localized hardening) to be detected.

Regarding tomography 242, various embodiments are described below.

In one embodiment, straight-ray tomography with time-of-flight input data is generally robust and rapid, but generally limited to shallow defects of small extent.

In one embodiment, curved-ray tomography with time-of-flight input data may allow refraction effects to be taken into account, but lacks robustness if the defect is diffracting.

In one embodiment, diffraction tomography with data comprising the total monochromatic field may allow diffraction effects to be taken into account, but is generally limited to small (but potentially deep) defects.

In one embodiment, hybrid tomography (e.g. the proprietary "HARBUT" technique) with time-of-flight input data and input data on the total monochromatic field may allow both diffraction effects and refraction effects to be taken into account, but requires a significant number of sensors if the maximum resolution must be achieved.

A plurality of other imaging techniques or methods 241 may be used, alone or in combination.

The total-focusing imaging method consists in acquiring the complete series of signals relating all the transmitting/receiving elements and in coherently summing the signals at every point in the imaged region.

The imaging technique may be the synthetic aperture focusing technique (SAFT). This technique allows an image to be obtained that is easy to interpret, by including the influence of the transducers, the coupling thereof and removal of noise from the image.

The imaging technique may be a beam-forming technique. This type of technique is a signal-processing technique used in antenna arrays and sensors for transmitting or receiving directional signals. It works by combining elements of a phased-array antenna in such a way that, in particular directions, the signals interfere constructively whereas in other directions the interference is destructive.

Time reversal is a physical process applicable to ultrasound that allows a wave to return to its source in the case of non-dissipative propagation.

Multiple signal classification (MUSIC) is a high-resolution method that is especially based on parametric signal models (e.g. particular properties of the covariance matrix of the signal, allowing the data space to be separated into two sub-spaces, the signal space generated by the sinusoids, and the noise space that is its orthogonal complement). In particular, the MUSIC method relies on the noise space.

In the imaging technique called "Excitelet", the residual signal is correlated with signals from a library, which are called atoms, these signals corresponding to the residual signals computed with a propagation model that comprises a plurality of modes and takes into account the dispersive effect of the material and the electromagnetic impedance of the transducers.

The delay-and-sum beam-forming imaging technique is a variant of the spatial filtering mentioned above. The minimum variance distortionless response (MVDR) imaging technique is also a variant of spatial filtering.

Reconstruction algorithms for the probabilistic inspection of damage (RAPID) may be used. This type of mapping is based on the statistical analysis of differences in certain characteristics of the signals measured in a (defectless) reference state and in the current (potentially damaged) state.

In one embodiment, the tomography is tomography of bulk ultrasonic waves 2421.

The free propagation of elastic waves through an unlimited medium is governed only by the equations of the movement. In practice, the propagation medium is often limited by one or more boundaries. If these boundaries form a structure such that all its characteristic dimensions are very large with respect to the wavelength, the elastic waves may be described as bulk elastic waves (the boundaries do not disturb the propagation of the waves through the bulk but solely induce a reflection when the wave approaches them).

In one embodiment, the tomography is tomography of guided ultrasonic waves 2422.

When a characteristic dimension of the propagation medium (for example the thickness of a plate) is similar to the wavelength, the elastic waves may be described as guided waves. Specifically, the waves reflect from surfaces or boundaries of the medium (boundary conditions). The propagation of the waves is then governed both by the equations of the movement and by the boundary conditions imposed by the boundaries. The boundaries of the medium (of the structure) disturb the propagation of the waves and constrain them.

There is a very wide variety of guided waves, depending on the structure and the properties of the media. In the case of plates, the guided waves that naturally appear are Rayleigh-Lamb waves. In SHM, Lamb waves excite the entire thickness of the plate and Rayleigh waves propagate at the surface.

These waves may be analyzed as a superposition of successive reflections of bulk waves from the surfaces of the plate.

The order of magnitude associated with the guided waves varies depending on the embodiments (i.e. the type of structure). In certain experimental embodiments, tomographs have been produced using sensors placed in disks of about 60 centimeters in diameter.

In one embodiment, the tomography is performed by analyzing times of flight 2423.

Time-of-flight tomography is not always optimal. This imaging may be carried out by inverting all of the times of flight between the FBG and/or PZT and/or EMAT sensors, each time of flight for each pair of sensors being deduced from the measurement by passive inverse filter.

In one embodiment, the method furthermore comprises a step of determining the function representative of the impulse response of the structure, which is performed in an initial or reference state of the structure, and comprising a step of imaging the structure, carried out by tomography in a current state, based on said first measurement, allowing certain geometric particularities of the structure to be identified.

Ideally, a single imaging (e.g. tomography) step is carried out. In practice, it may be advantageous to calibrate the method. To this end, a series of imaging steps may be performed.

In one embodiment, the method furthermore comprises a second measurement performed in a subsequent state with the same pairs of measurement points as the first measurement and furthermore comprising producing a map by tomography of the variations in velocities of propagation through the structure between the initial state and the subsequent state, the map being obtained from the differences in the measured signals between the two states.

This subtractive step aims to eliminate errors in the positions of the sensors. Specifically, the sensors may, during the placement thereof (or thereafter), move (e.g. slide under the effect of pressure, as a result of heating or polymerization processes, etc.); hence, a calibration step allows the geometry, which is unknown or poorly known to start with, to be determined.

In one embodiment, the temperature of the structure may be measured and a variation in time of flight induced by a change in temperature may be compensated for. Specifically, temperature may (according to the circumstances) influence the times of flight, and it may in certain situations be desirable to be able to correct or compensate for thermal effects. Specifically, a thermocouple may be used, but other measuring methods are possible such as measurement via Bragg gratings, for example the same as those used to measure the diffuse elastic field.

In one embodiment, the tomography is performed by analyzing the (complete) spectral content of a wave packet 2434 (see below).

In one embodiment, a sensor comprises an FBG sensor and the FBG sensors are borne by at least one optical fiber.

In one embodiment, a sensor comprises a PZT piezoelectric transducer.

In one embodiment, a sensor comprises an EMAT.

In one embodiment, the measuring steps are reiterated 250 over time so as to determine the dynamic behavior of the structure.

Experimental tests have been carried out with about thirty sensors, the measurements being reiterated every ten seconds. Depending on the embodiments, it is realistic to envision reiterating the measurements in time intervals of about one hundred milliseconds.

This embodiment comprising a time loop is advantageous in that it allows dynamic deformations of the structure (for example when placed under stress, e.g. subjected to a localized heat source) to be viewed. With the exception of real-time or ultra-rapid (high-frequency) dynamic effects, certain embodiments of the invention therefore allow effects especially comprising deformations and/or dilations of the structure or one or more stress fields such as (non-exhaustively) the diffusion of a temperature field through the structure to be detected and imaged.

Figure 3:
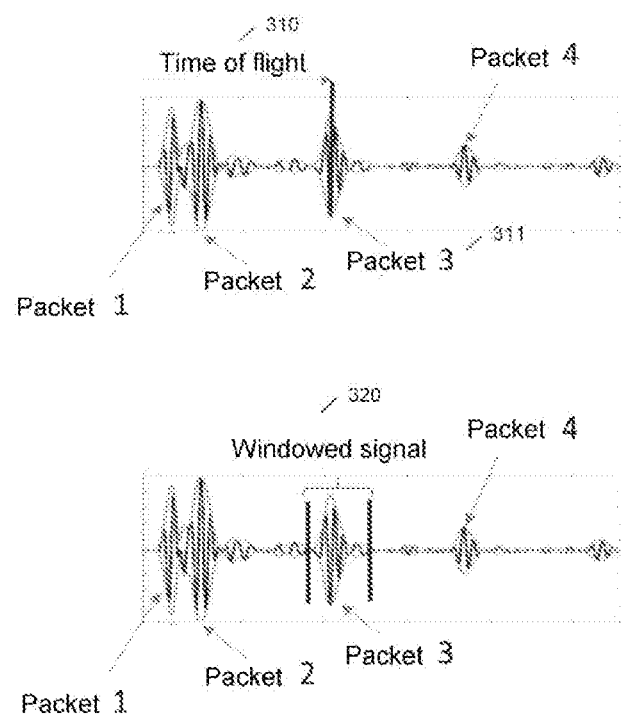
FIG. 3 illustrates a method for analyzing the complete spectral content.

FIG. 3 illustrates a method for analyzing the complete spectral content.

In one embodiment, the tomography is performed by analyzing the (complete) spectral content of a wave packet 2434.

Specifically, the invention is able to manipulate not only time of flight but also the phase of the signal. The tomography may be performed by analyzing the spectral content of one or more wave packets selected from a plurality thereof.

Various propagation modes associated with the wave packets may be distinguished between, each mode propagating at a different velocity through the structure. A mode of interest may be selected by windowing the time-domain signal. The entirety of the spectral content of this windowed signal may then be manipulated by the invention.

An ultrasonic signal between two sensors generally takes the form illustrated in FIG. 3.

Various wave packets may be identified, which generally correspond to different modes. For the tomography, a single packet is generally manipulated (for example the wave packet numbered 311, which corresponds to the same mode for all the pairs of sensors. For time-of-flight tomography 310, the maximum amplitude of the envelope of the packet may be determined, this providing on return the time of flight.

For tomography based on the complete signal, the signal may be windowed around the packet, and all the signal inside this window 320 may be exploited.

Figure 4:
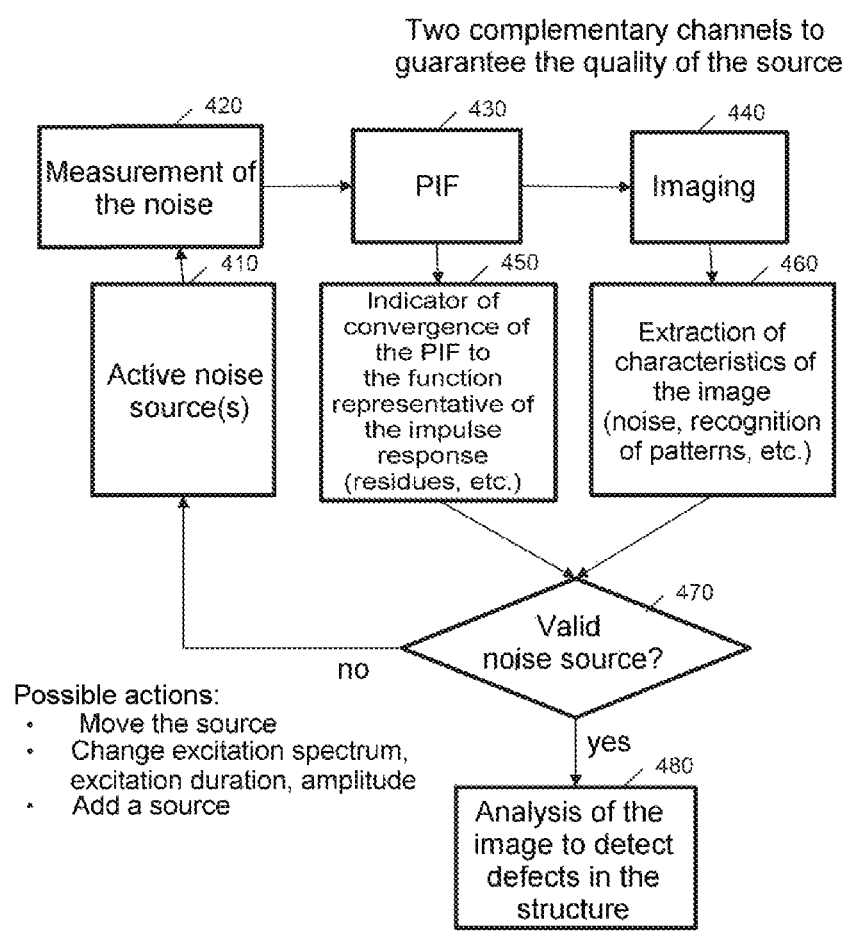
FIG. 4 illustrates an optional embodiment of the invention.

FIG. 4 illustrates an optional embodiment of the invention.

In one embodiment, the position in space of each measurement point is measured beforehand.

Knowledge of the geometry (positions of sensors) is not an essential feature: it may be deduced by calibration (see below). It is however advantageous to know this geometry if this is possible.

In one embodiment, the number and/or the positions of the noise sources and/or of the sensors may be adjusted.

After activation of the noise source 410, the noise is measured 420, the analysis by inverse filter is performed 430 and lastly one or more images are determined 440, especially by tomography.

Two feed-back loops may be differentiated between. The attributes (nature, number, position) of the active noise sources 410 may be automatically controlled in the steps of the method, in particular depending on the quality of the convergence of the passive inverse filter to the function representative of the impulse response 450 and/or depending on the quality of the imaging 460 obtained after processing of the noise by the passive inverse filter. The step of analyzing by passive inverse filter 430 may be associated with various indicators 450 as to the convergence of the filter to the function representative of the impulse response. The imaging step 440 may be associated with the extraction of characteristics of the image (e.g. noise, recognition of patterns). To this end, it may be determined whether the noise source in question 470 is valid or not. Lastly, in step 480, the resulting image is analyzed to detect potential defects in the structure.

Regarding the list of the actions that may result from the analyses performed, whether in a feed-back or feed-forward mode, the position of a sensor (or a noise source) may be changed. The excitation spectrum may be modified (e.g. excitation duration, amplitude, etc.). Sensors (or a noise source) may be added or removed.

In certain embodiments, the sensors and/or noise sources are moveable. For example, robotic systems may regulate the number, the nature and/or the position of the sensors. Micro-movements are possible in certain cases.

In one embodiment, the arrangement of the sensors in space is independent of (i.e. is "not dependent on" or "not essentially dependent on") at least one active noise source. The imaging arrangement may especially depend on or be automatically controlled depending on or be conditional on the imaging.

Specifically, the method for analyzing the diffuse elastic field by passive inverse filter allows the signal to be accentuated, i.e. the least amount of energy (potentially) present in each direction of space to be collected and exploited. Hence, the physical arrangement of the sensors is less critical than in the case of an analysis by correlation. In the limiting case and in practice, the positions of the sensors may no longer depend on the sources of (ambient or artificial) noise. In contrast, the arrangement (topography/topology) of the sensors may be optimized with respect to the imaging (mapping, tomography) steps.

FIG. 5 compares certain aspects of the methods for analyzing by correlation and by passive inverse filter in the context of the invention.

Patent application WO2015/082292 described a method for analyzing by correlation. This type of analysis is less suitable in certain situations than analysis by passive inverse filter.

Regarding their principle 510: a method for analyzing by correlation computes the correlation of the noise measured simultaneously at two points A and B (function representative of the impulse response G(A,B)) whereas a method by passive inverse filter measures the noise simultaneously at all the points of interest Xi then computes the passive inverse filter, which delivers a function representative of the impulse response G(Xi,Xj) for each of the pairs of points.

Regarding the acquisition process 520: a method for analyzing by correlation is able to take simultaneous measurements pair by pair whereas a method by passive inverse filter necessarily takes simultaneous measurements at all the (addressable) points. The pair-by-pair analysis may be advantageous for example if it is not possible to use multi-channel systems capable of managing large data streams and if the source does not vary significantly over time. Measurements carried out at all the points may be rapid, but potentially more expensive.

If the assumption of equipartition of energy is valid 530: a method for analyzing by correlation is suitable and a method by passive inverse filter is also suitable but the residues are generally smaller than when correlation is used. The function representative of the impulse response of the structure, which is determined by the passive inverse filter, is then generally of better quality, i.e. it lends itself better to a subsequent analysis to detect defects. The quality of the reconstruction may be expressed in terms of the signal-to-noise ratio of the determined signal: the signal represents the useful information whereas the noise (here the "residues", not to be confused with the ambient noise) represents a level of fluctuations that would be obtained as output from the passive inverse filter computation even in the absence of significant signal. In general, the longer the time period over which the diffuse elastic field is measured, the better the convergence of the passive inverse filter to the function representative of the impulse response. In other words: the signal-to-noise ratio will be higher (the residues are smaller in the computed signal).

If the assumption of equipartition of energy is not valid 540: a method for analyzing by correlation may not converge (high asymmetry in the function representative of the impulse response and significant residues) whereas a method for analyzing by passive inverse filter may compensate for non-uniformities in the flux (i.e. accentuate information as soon as there is the smallest amount of energy in the directions of interest). Regarding frequency behavior 550: a method for analyzing by correlation requires the spectrum to be whitened (to broaden the passband of the response or subsequent filtering of the function representative of the impulse response), whereas a method by passive inverse filter naturally allows (i.e. without an additional processing step) the spectrum to be whitened (signal is collected as soon as there is the smallest amount of energy at the frequencies of interest).

Regarding the number of sensors 560, the higher their number becomes, the better the results with the method by passive inverse filter (and the tomography is also better). In contrast, correlation-based processing does not benefit from an increase in the number of sensors in the structure, the quality of the obtained functions representative of the impulse responses not being improved thereby.

Regarding computing cost 570, a method by correlation is generally rapid for few points, but the cost rapidly increases as the number of points increases. A method by passive inverse filter is generally demanding in terms of use of memory resources (in particular as all the signals must be simultaneously loaded into RAM) but allows all the functions representative of the impulse responses of the sensor distribution in question to be determined simultaneously.

The present invention may be implemented using hardware and/or software elements. It may be made available in the form of a computer-program product on a computer-readable medium. The medium may be electronic, magnetic, optical or electromagnetic.

The invention claimed is:

1. A computer-implemented method for analyzing a state of a structure, the method comprising:
   deploying in or on a structure to be analyzed, a plurality of sensors of the type Fiber Bragg Grating (FBG) sensor, the FBG sensors being borne by at least one optical fiber;
   measuring a diffuse elastic field propagating through the structure by interrogating at least some of the plurality of FBG sensors, each interrogated FBG sensor being a point of measure;
   determining by passive inverse filter functions representative of an impulse response of the structure, for some FBG sensor pairs of the plurality of FBG sensors interrogated, each function representative of an impulse response of the structure being a signal allowing to analyze the state of the structure; and
   determining one or more images comprising a map of propagation of elastic waves through the structure.

2. The method as claimed in claim 1, the step of determining, by passive inverse filter, a function representative of the impulse response of the structure to be analyzed comprising the steps of (i) dividing signals measured by all the interrogated FBG sensors into a plurality of sub-vectors or pseudo-sources and (ii) decomposing, into singular values, monochromatic propagation matrices.

3. The method as claimed in claim 1, the step of determining by passive inverse filter a function representative of the impulse response of the structure to be analyzed comprising the steps of a) dividing a measured time-domain signal into a plurality of sub-vectors or pseudo-sources; b) decomposing, into singular values, monochromatic propagation matrices determined from the pseudo-sources in the frequency domain; c) obtaining the function representative of the impulse response in the time domain by inverse Fourier transform.

4. The method as claimed in claim 1, furthermore comprising the step of determining the state of the structure by analyzing by tomography the one or more images comprising a map of propagation of elastic waves through the structure.

5. The method as claimed in claim 4, the tomography being performed via analysis of spectral content of a wave packet.

6. The method as claimed in claim 1, the images being determined by one or more imaging methods selected from a tomography imaging method, an ultrasonography imaging method, a total-focusing imaging method, a synthetic aperture imaging method, a spatial-filtering imaging method, a time-reversal imaging method or a high-resolution imaging method.

7. The method as claimed in claim 1, the measuring step being reiterated over time so as to determine the dynamic behavior of the structure.

8. A system for analyzing a state of a structure, the system comprising:
   a plurality of Fiber Bragg Grating (FBG) sensors deployed in or on the structure to be analyzed, the FBG sensors being borne by one or more optical fibers coupled to at least one or more of light sources;
   means for measuring a diffuse elastic field propagating through the structure by interrogating at least some of the plurality of FBG sensors, wherein each interrogated FBG sensor being a point of measure; and
   means for determining by passive inverse filter functions representative of an impulse response of the structure, for some FBG sensor pairs of the plurality of FBG sensors interrogated, each function representative of an impulse response of the structure being a signal allowing to analyze the state of the structure.

9. The system as claimed in claim 8, comprising:
   at least one photodetector and/or at least one optical spectrum analyzer for analyzing reflected light after its journey through the optical fiber; and
   computational resources for processing signals received from the at least one of the FBG sensors, in order to perform analyses by passive inverse filter and imaging.

10. The system as claimed in claim 8, wherein a light source is a variable-wavelength laser or a wideband optical source, a reflected optical spectrum of which is defined.

11. The system comprising as claimed in claim 8, further comprising optical fibers being multiplexed by means of at least one optical circulator and/or one multiplexer.

12. The system as claimed in claim 8, further comprising one or more active noise sources positioned in or on or in proximity to the structure so as to obtain the diffuse elastic field.

13. The system as claimed in claim 8, wherein an arrangement of the sensors in space being independent of at least one active noise source and/or being dependent on imaging.

* * * * *